(12) United States Patent
Lynn (10) Patent No.: US 10,265,788 B2
(45) Date of Patent: Apr. 23, 2019

(54) CHAINSAW SHARPENING DEVICE, SYSTEM, AND METHOD

(71) Applicant: Scott D. Lynn, Tellico Plains, TN (US)

(72) Inventor: Scott D. Lynn, Tellico Plains, TN (US)

( * ) Notice: Subject to any disclaimer, the term of this patent is extended or adjusted under 35 U.S.C. 154(b) by 134 days.

(21) Appl. No.: 15/364,906

(22) Filed: Nov. 30, 2016

(65) Prior Publication Data

US 2017/0232537 A1 Aug. 17, 2017

Related U.S. Application Data

(60) Provisional application No. 62/261,008, filed on Nov. 30, 2015.

(51) Int. Cl.
*B23D 63/16* (2006.01)

(52) U.S. Cl.
CPC .................................. *B23D 63/166* (2013.01)

(58) Field of Classification Search
CPC ... B23D 63/162; B23D 63/164; B23D 63/166
USPC .......................................... 76/25.1, 36, 80.5
See application file for complete search history.

(56) References Cited

U.S. PATENT DOCUMENTS

| | | | | | |
|---|---|---|---|---|---|
| 2,792,724 | A | * | 5/1957 | Durall | B23D 63/166 76/40 |
| 2,805,587 | A | * | 9/1957 | Goehle | B23D 63/162 409/216 |
| 3,091,136 | A | * | 5/1963 | Maier | B23D 63/162 76/36 |
| 3,093,016 | A | * | 6/1963 | Spence | B23D 63/162 76/36 |
| 3,172,307 | A | * | 3/1965 | Kephart, Jr. | B23D 63/162 76/36 |
| 3,338,116 | A | * | 8/1967 | McLean | B23D 63/162 76/36 |
| 3,942,255 | A | * | 3/1976 | Bakoledis | B23D 63/162 33/202 |
| 4,173,908 | A | * | 11/1979 | Aksamit | B23D 63/162 76/36 |
| 4,242,926 | A | * | 1/1981 | Anton | B23D 63/162 451/344 |
| 4,319,502 | A | * | 3/1982 | Smith | B23D 63/166 76/40 |

(Continued)

FOREIGN PATENT DOCUMENTS

| | | |
|---|---|---|
| AU | 2015101103 | 9/2015 |
| CA | 2527835 | 2/2011 |

(Continued)

*Primary Examiner* — Hwei-Siu C Payer
(74) *Attorney, Agent, or Firm* — Pitts & Lake, P.C.

(57) ABSTRACT

The present general inventive concept is directed to a chainsaw sharpening device including a cutting tooth sharpener, a base coupled to the cutting tooth sharpener, a first side member coupled to the base and configured to face a first side of a chainsaw bar, a second side member coupled to the base and configured to face a second side of the chainsaw bar, and a guide member coupled to the base and configured to be slidable along a plurality of top plates of a respective plurality of cutting teeth of a saw chain mounted on the chainsaw bar, wherein the chainsaw sharpening device is configured to be moved to a desired cutting tooth of the mounted saw chain to perform a sharpening procedure without being fixed to the chainsaw bar.

15 Claims, 9 Drawing Sheets

(56) References Cited

U.S. PATENT DOCUMENTS

| | | | | |
|---|---|---|---|---|
| 4,440,045 A * | 4/1984 | Aksamit | ............... | B23D 63/162 |
| | | | | 451/451 |
| 4,463,630 A * | 8/1984 | Turner | ................. | B23D 63/166 |
| | | | | 76/41 |
| 4,535,654 A * | 8/1985 | White | ................... | B23D 63/162 |
| | | | | 33/202 |
| 4,658,677 A * | 4/1987 | Lusetti | ................. | B23D 63/166 |
| | | | | 76/80.5 |
| 4,727,776 A * | 3/1988 | Granberg | ............. | B23D 63/162 |
| | | | | 76/36 |
| 4,762,027 A * | 8/1988 | Fagiolini | .............. | B23D 63/166 |
| | | | | 76/40 |
| 5,098,348 A | 3/1992 | O'Neel | | |
| 5,107,726 A | 4/1992 | Wilhite et al. | | |
| 6,079,295 A | 6/2000 | Beard | | |
| 6,128,997 A | 10/2000 | Nitschmann | | |
| 6,334,809 B1 * | 1/2002 | Spang | ................. | B23D 63/168 |
| | | | | 451/45 |
| 6,569,003 B1 | 5/2003 | Harlan | | |
| 6,748,840 B2 | 6/2004 | Harfst | | |
| 7,431,637 B2 | 10/2008 | Nishigaki | | |
| 7,862,406 B2 | 1/2011 | McIntyre | | |
| 7,909,681 B2 | 3/2011 | Nishigaki | | |
| 8,647,177 B2 * | 2/2014 | Sasanuma | ............ | B23D 63/168 |
| | | | | 451/349 |
| 8,746,118 B2 | 6/2014 | Seigneur et al. | | |
| 8,932,114 B2 | 1/2015 | Seigneur et al. | | |
| 8,950,073 B2 | 2/2015 | Seigneur et al. | | |
| 9,038,519 B2 | 5/2015 | Goettel et al. | | |
| 2007/0119278 A1 | 5/2007 | Ranker | | |
| 2007/0167121 A1 * | 7/2007 | Cendak | ................ | B23D 63/166 |
| | | | | 451/419 |
| 2014/0283665 A1 | 9/2014 | Seigneur et al. | | |
| 2015/0113818 A1 | 4/2015 | Sohlman et al. | | |
| 2017/0232537 A1 * | 8/2017 | Lynn | .................... | B23D 63/166 |
| | | | | 76/80.5 |

FOREIGN PATENT DOCUMENTS

| | | |
|---|---|---|
| CA | 2624962 | 1/2013 |
| DE | 202004012007 | 3/2005 |
| EP | 2067558 | 6/2009 |
| EP | 2067559 | 6/2009 |
| WO | WO2011070425 | 6/2011 |
| WO | WO2012177199 | 12/2012 |
| WO | WO2014005641 | 1/2014 |

* cited by examiner

CHAINSAW SHARPENING DEVICE, SYSTEM, AND METHOD

CROSS-REFERENCE TO RELATED APPLICATIONS

This application claims the benefit of U.S. Provisional Patent Application Ser. No. 62/261,008, filed on Nov. 30, 2015, the contents of which are incorporated herein by reference in its entirety.

FIELD OF INVENTION

The present general inventive concept relates to a chainsaw sharpener, and, more particularly, a chainsaw sharpener that is movable along an installed saw chain during a cutting tooth sharpening procedure.

BACKGROUND

Power saws, for example, chainsaws, are essential tools for clearing trees, and are used both for felling the trees, trimming the trees, and cutting the trees down to more manageable sections. While some chainsaws are handheld, larger versions may be mounted on a heavy base, a vehicle, etc. It is essential, both for efficiency and for safety, that the cutting teeth on the saw chain that rotates around the chainsaw bar of the chainsaw be as sharp as possible. Unfortunately, the cutting teeth may be quickly dulled with even normal operation. Such a problem is heightened in the logging industry, in which such chainsaws may be used during the entire day.

Thus, the cutting teeth of such chainsaws ideally need to be sharpened on a regular basis. As a great many cutting teeth are provided to the saw chain, the nature of the length and configuration of the saw chain makes the sharpening of the cutting teeth a daunting process. One method of sharpening the saw chain is to remove the chain from the chainsaw bar and use a table mounted device through which the saw chain is moved to sharpen the cutting teeth one at a time. Another method is to use a fixed, bar-mounted sharpening device through which the saw chain is advanced to sharpen the cutting teeth without removing the saw chain from the chainsaw bar. As both of these methods include advancing the saw chain through the device one cutting tooth at a time to securely sharpen that particular cutting tooth, the procedure is tedious and time consuming, and can negatively impact industry profits due to the corresponding down time.

Therefore, a device and method of sharpening a saw chain in a more efficient manner so that the chainsaw can quickly be returned to service is desired.

BRIEF SUMMARY

According to various example embodiments of the present general inventive concept, a chainsaw sharpening device, system, and method are provided in which sharpening device is configured to fit over the saw chain and chainsaw bar such that the device is able to slide forward from tooth to tooth, allowing sharpening of the cutting tooth without the device being secured to the chainsaw bar.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a chainsaw sharpening device including a cutting tooth sharpener, a base coupled to the cutting tooth sharpener, a first side member coupled to the base and configured to face a first side of a chainsaw bar, a second side member coupled to the base and configured to face a second side of the chainsaw bar, and a guide member coupled to the base and configured to be slidable along a plurality of top plates of a respective plurality of cutting teeth of a saw chain mounted on the chainsaw bar, wherein the chainsaw sharpening device is configured to be moved to a desired cutting tooth of the mounted saw chain to perform a sharpening procedure without being fixed to the chainsaw bar.

The guide member may be configured to have a substantially similar width as an overall width of the top plates of the cutting teeth.

The guide member may be configured to have at least one angled portion at a forward end thereof to correspond to a top plate cutting edge of a plurality of the cutting teeth.

The guide member may be configured to have two angled portions at the forward end thereof to correspond to the top plate cutting edge of differently configured cutting edges of the plurality of the cutting teeth.

A forward end of the guide member may extend farther from the base than does the first and second side members.

The first and second side members may be configured to guide the base along the chainsaw bar without being fixed to chainsaw bar.

The first and second side members may be configured to keep the base substantially centered at a top of the chainsaw bar.

The first and second side members may be provided with magnetic elements that oppose the chainsaw bar to keep the base substantially centered at a top of the chainsaw bar.

The first and second side members may be provided with retractable wheels configured to contact the chainsaw bar to keep the base substantially centered at a top of the chainsaw bar.

The first and second side members may be provided with retractable members to contact the chainsaw bar without fixing the base to the chainsaw bar.

The retractable members may be provided with a low friction material to contact the chainsaw bar.

The low friction material may include a fabric and/or foam material.

The first and second side members may be configured to be pivotable relative to the base such that a gap between the first and second side members may be widened to fit over the saw chain.

The first and second side members may be configured to have slidable or rolling members to contact the chainsaw bar without fixing the base to the chainsaw bar.

The cutting tooth sharpener may be a rotary grinder.

The cutting tooth sharpener may be configured to be pivotable relative to the base such that the cutting tooth sharpener is able to move to and from the desired cutting tooth.

An angled forward edge of the guide member may be configured to be positioned to indicate a contact area of the cutting tooth to be contacted by the cutting tooth sharpener.

The angled forward edge of the guide member may be configured to align with the top plate cutting edge of the cutting tooth to be sharpened.

The cutting tooth sharpener may be configured to be pivotable in a lateral direction relative to the guide member to adjust an angle of the sharpening procedure.

The guide member may be adjustable in a forward and backward direction to correspond to the angle of the sharpening procedure.

First indicia may be provided on the base to indicate a range of angles to which the cutting tooth sharpener may be adjusted, and second indicia may be provided on the guide member to align the guide member to a corresponding angle selected for the cutting tooth sharpener.

The respective securing members may be provided to the base to secure the cutting tooth sharpener and the guide member at selected settings.

One or both of the securing members may be push button release members.

The rotary grinding member may be provided with a transparent guard such that a user may visually locate a forward edge of the guide member during the sharpening procedure.

The foregoing and/or other aspects and advantages of the present general inventive concept may also be achieved by a slidable device to be used in a chainsaw sharpening procedure, the device including a base configured to fit over a saw chain mounted on a chainsaw bar, a first side member coupled to the base and configured to face a first side of the chainsaw bar, a second side member coupled to the base and configured to face a second side of the chainsaw bar, and a guide member coupled to the base and configured to be slidable along a plurality of top plates of a respective plurality of cutting teeth of a saw chain mounted on the chainsaw bar, wherein the device is configured to be slidably moved along the mounted saw chain to a desired cutting tooth to perform a sharpening procedure without the device being fixed to the chainsaw bar.

The guide member may be configured to indicate a top plate cutting edge of the desired cutting tooth to be sharpened.

The guide member may also be configured to guide a sharpening device to the top plate cutting edge.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Herein, the term "chainsaw" is used generally for a variety of devices in which a chain provided with cutting teeth is rotated around a body to perform a sawing operation. The body around which the chain rotates, or at least the portion of the body germane to this description, is generally referred to herein as the chainsaw bar, and typically extends from a motorized portion of the chainsaw. Such chainsaws may be a personal motorized chainsaw wielded by a user to saw trees, larger base mounted chainsaw devices to which the trees are fed, and so on. The chain provided with the cutting teeth may be referred to herein as a saw chain, and the cutting teeth are typically provided with a top plate which provides a generally flat surface along adjacent cutting teeth moving along a generally planar section of the chainsaw bar. The cutting teeth may have a top plate cutting edge at a forward end of the top plate, and a side plate cutting edge extending downwardly from the top plate. The cutting tooth sharpening procedures discussed herein may include the sharpening of substantially only the top plate cutting edge, or the side plate cutting edge, or both the top plate cutting edge and side plate cutting edge.

According to various example embodiments of the present general inventive concept, a slidable device to be used in a chainsaw sharpening procedure is provided, the device including a base configured to fit over a saw chain mounted on a chainsaw bar, a first side member coupled to the base and configured to face a first side of the chainsaw bar, a second side member coupled to the base and configured to face a second side of the chainsaw bar, and a guide member coupled to the base and configured to be slidable along a plurality of top plates of a respective plurality of cutting teeth of a saw chain mounted on the chainsaw, wherein device is configured to be slidably moved along the mounted saw chain to a desired cutting tooth to perform a sharpening procedure without the device being fixed to the chainsaw bar. In various example embodiments of the present general inventive concept, the device may be provided with a cutting tooth sharpener to form a chainsaw sharpening device, and the chainsaw sharpening device may be configured to be moved to a desired cutting tooth of the mounted saw chain to perform a sharpening procedure without being fixed to the chainsaw bar.

Figure 1:
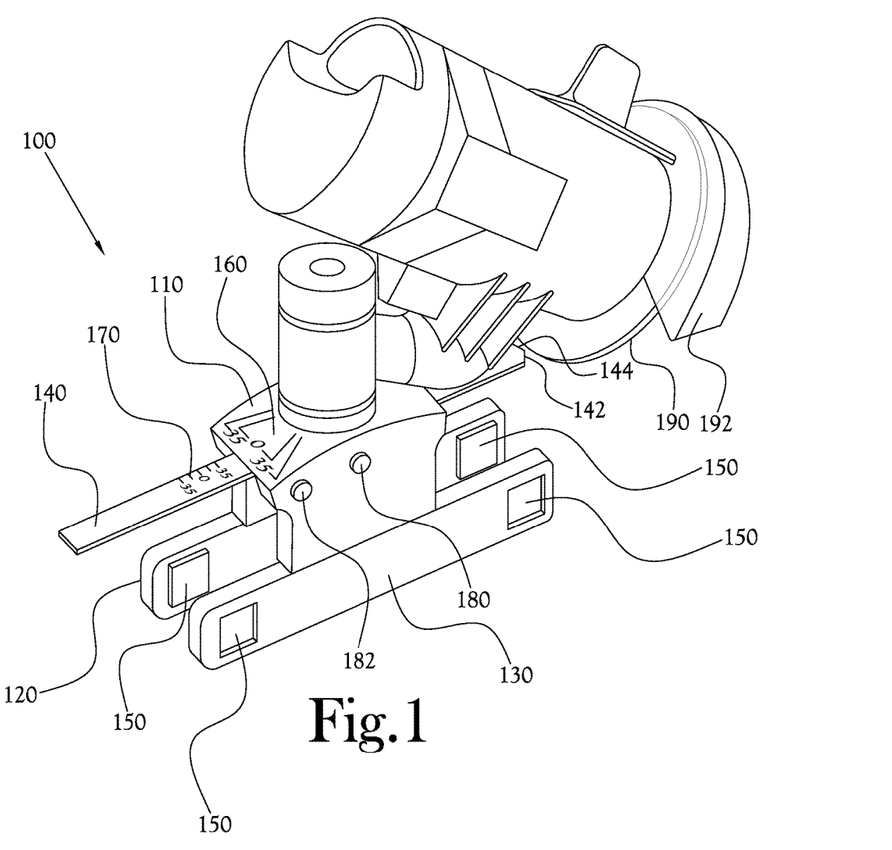
FIG. 1 illustrates a chainsaw sharpening device according to an example embodiment of the present general inventive concept.

FIG. 1 illustrates a chainsaw sharpening device according to an example embodiment of the present general inventive concept. In the example embodiment illustrated in FIG. 1, the chainsaw sharpening device 100 includes a base 110 to which a cutting tooth sharpener 190 is coupled. In the example embodiment of FIG. 1, the cutting tooth sharpener is a rotary grinder, but other example embodiments may employ different sharpening devices. According to various example embodiments, such a motorized sharpener may be powered externally to the device 100, or by a battery included in or attached to a housing of the device 100. A first side member 120 is provided to the base 110 and is configured to extend downward from the base 110 to face a first side of a chainsaw bar, and a second side member 130 is provided to the base 110 and is configured to extend downward from the base 110 to face a second side of the chainsaw bar. Although the side members 120,130 are illustrated in this example embodiment as being elongated in a direction of the chainsaw bar, and continuous from end to end, it is understood that different shapes, including interrupted arrangements, may be used within the scope of the present general inventive concept. Also, a plurality of side members may be provided on one or both sides extending from the base 110. A guide member 140 is provided to the base 110 and configured to be slidable along the tops of a plurality of the top plates of the cutting teeth of a saw chain while the saw chain is mounted on the chainsaw bar. As illustrated in FIG. 1, the guide member 140 has a substantially flat bottom surface so as to rest upon the plurality of top plates, and therefore, due to the interaction of the guide member 140 and the top plates of the cutting teeth, as well as the guiding of the side members 120,130 on either side of the chainsaw bar, the chainsaw sharpening device can be moved to a desired cutting tooth of the mounted saw chain to perform a sharpening procedure without being fixed to the chainsaw bar. In other words, while conventional sharpening devices operate by being fixed to one place on the chainsaw bar, and the chain being advanced tooth by tooth through the device, the example embodiment of the present general inventive concept illustrated in FIG. 1 is able to be placed over the saw chain to rest atop the saw chain, and slid along the top of the saw chain from tooth to tooth, and the grinder applied to the desired tooth, which greatly reduces the time and effort required to sharpen the saw chain by the conventional device. Although the cutting teeth of the saw chain have been described herein as having top plates that provide a substantially flat plane along the top of the saw chain relative to the chainsaw bar, it is not necessary for the device of the present general inventive concept that the top plates form such a flat relative plane, as the guide member 140 will generally slide along the topmost portions of the saw chain due to the configuration of the guide member 140 extending along the tops of a plurality of the teeth of the saw chain. As merely one example embodiment, the guide member 140 may be configured to span 6-8 teeth of a saw chain. Also, while the embodiments described herein include a guide member that is slidable along the tops of the cutting teeth of the saw chain, various example embodiments may provide a device that is simply movable over the teeth of the saw chain without being fixed to the chainsaw bar and without actually sliding, in which case the guide member simply provides support for the device to rest on top of the saw chain. The guide member 140 and/or side members 120,130 may be separate components coupled to the base 110, or may be formed continuously from the same body.

According to various example embodiments of the present general inventive concept, the guide member 140 may be configured to have a substantially similar width as an overall width of the top plates of the cutting teeth, thus providing stability while the device 100 is at rest and/or moving along the saw chain. The guide member 140 may be configured to have at least one angled portion 142 at a forward end thereof to correspond to a top plate cutting edge of a plurality of the cutting teeth, so that the angled end may accommodate the action of the sharpening grinder 190 moving down to sharpen the cutting tooth. The guide member 140 may be configured to have two angled portions 142,144 at the forward end thereof to correspond to the top plate cutting edge of differently configured cutting edges of the plurality of the cutting teeth. This is due to the cutting teeth of a saw chain typically having alternating cutting angles to aid in the sawing operation.

According to various example embodiments of the present general inventive concept, a forward end of the guide member 140 may extend farther from the base 110 than does the first and second side members 120,130, so that the guide member 140 and sharpening grinder 190 have access to cutting teeth past a point at which ends of the side members 120,130 may abut a blocking portion of the chainsaw bar.

The first and second side members 120,130 are configured to guide the base 110 along the chainsaw bar without being fixed to chainsaw bar. While the conventional chainsaw sharpening device has similar members that are fixed to the chainsaw bar by a screw-tightening means or similar method, the first and second side members 120,130 of the present general inventive concept simply guide the base 110 along the chainsaw bar, and may provide additional stability as the device 100 rests atop the saw chain. The first and second side members 120,130 may be configured to keep the base substantially centered at a top of the chainsaw bar. According to various example embodiments of the present general inventive concept, the first and second side members 120,130 may be provided with magnetic elements 150 that oppose the chainsaw bar to keep the base substantially centered at a top of the chainsaw bar. In other words, the magnetic force of the magnetic elements 150 may repel the metal forming the chainsaw bar to keep the device 100 centered on the chainsaw bar without touching the chainsaw bar, or at least reducing any such contact and friction associated therewith. According to various example embodiments of the present general inventive concept, the first and second side members 120,130 may be provided with retractable wheels configured to contact the chainsaw bar to keep the base 110 substantially centered at a top of the chainsaw bar. According to various example embodiments of the present general inventive concept, the first and second side members 120,130 may be provided with other types of retractable members to contact the chainsaw bar without fixing the base 110 to the chainsaw bar. For example, the retractable members may be provided with a low friction material to contact the chainsaw bar. The low friction material may include a fabric or foam material. According to various example embodiments of the present general inventive concept, the first and second side members 120,130 may be configured to be pivotable relative to the base 110 such that a gap between the first and second side members 120,130 may be widened to fit over the saw chain, and then released to form a more narrow margin between the side members 120,130 when facing the chainsaw bar. Such a margin may be fixed, or may be biased to contact various widths of the chainsaw bar. The pivotal first and second side members may be configured to have slidable or rolling members to contact the chainsaw bar without fixing the base 110 to the chainsaw bar.

As previously described, according to various example embodiments of the present general inventive concept, the cutting tooth sharpener 190 may be a rotary grinder. The cutting tooth sharpener 190 may be configured to be pivotable relative to the base 110 such that the cutting tooth sharpener 190 is able to move to and from the desired cutting tooth. For example, a user may be able to move the cutting tooth sharpener 190 down to the cutting tooth to grind, or sharpen, the cutting tooth edge, and then move the grinder 190 back up to a position away from the saw chain so that the user can slide the device 100 quickly to the next desired cutting tooth. According to various example embodiments of the present general inventive concept, an angled forward edge of the guide member 140 may be configured to be positioned to indicate a contact area of the cutting tooth to be contacted by the cutting tooth sharpener 190. Thus, the user can quickly slide the device 100 to the exact point at which the sharpening motion is to be made, reducing the time required to perform each cutting tooth sharpening operation. According to various example embodiments of the present general inventive concept, the angled forward edge of the guide member 140 may be configured to align with the top plate cutting edge of the cutting tooth to be sharpened, such that the grinder is moving immediately adjacent to the angled forward edge of the guide member 140. Such a configuration allows the user to move the device 100 to a point where the angled end of the guide member 140 is aligned with the cutting tooth edge to be sharpened.

According to various example embodiments of the present general inventive concept, the cutting tooth sharpener 190 may be configured to be pivotable in a lateral direction relative to the guide member 140 to adjust an angle of the sharpening procedure. Thus, a user can rotate the cutting tooth sharpener 190 in a plane substantially parallel to the top plates of the saw chain to change the angle of the cut in either direction. Similarly, in various example embodiments the guide member 140 may be adjustable in a forward and backward direction to correspond to the angle of the sharpening procedure. According to various example embodiments of the present general inventive concept, first indicia 160 may be provided on the base 110 to indicate a range of angles to which the cutting tooth sharpener 190 may be adjusted, and second indicia 170 may be provided on the guide member 140 to allow alignment of the guide member 140 with a corresponding angle selected for the cutting tooth sharpener 190. Respective securing members 180,182 may be provided to the base to secure the cutting tooth sharpener 190 and the guide member 140 at selected settings. According to various example embodiments of the present general inventive concept, one or both of the securing members 180,182 may be push button release members.

According to various example embodiments of the present general inventive concept, the rotary grinding member 190 may be provided with a transparent guard 192 such that a user may visually locate a forward edge of the guide member 140 during the sharpening procedure. Thus, a user is able to easily see whether guide member 140 remains at the desired location as the rotary grinder 190 is moved to sharpen the cutting tooth.

Figure 2:
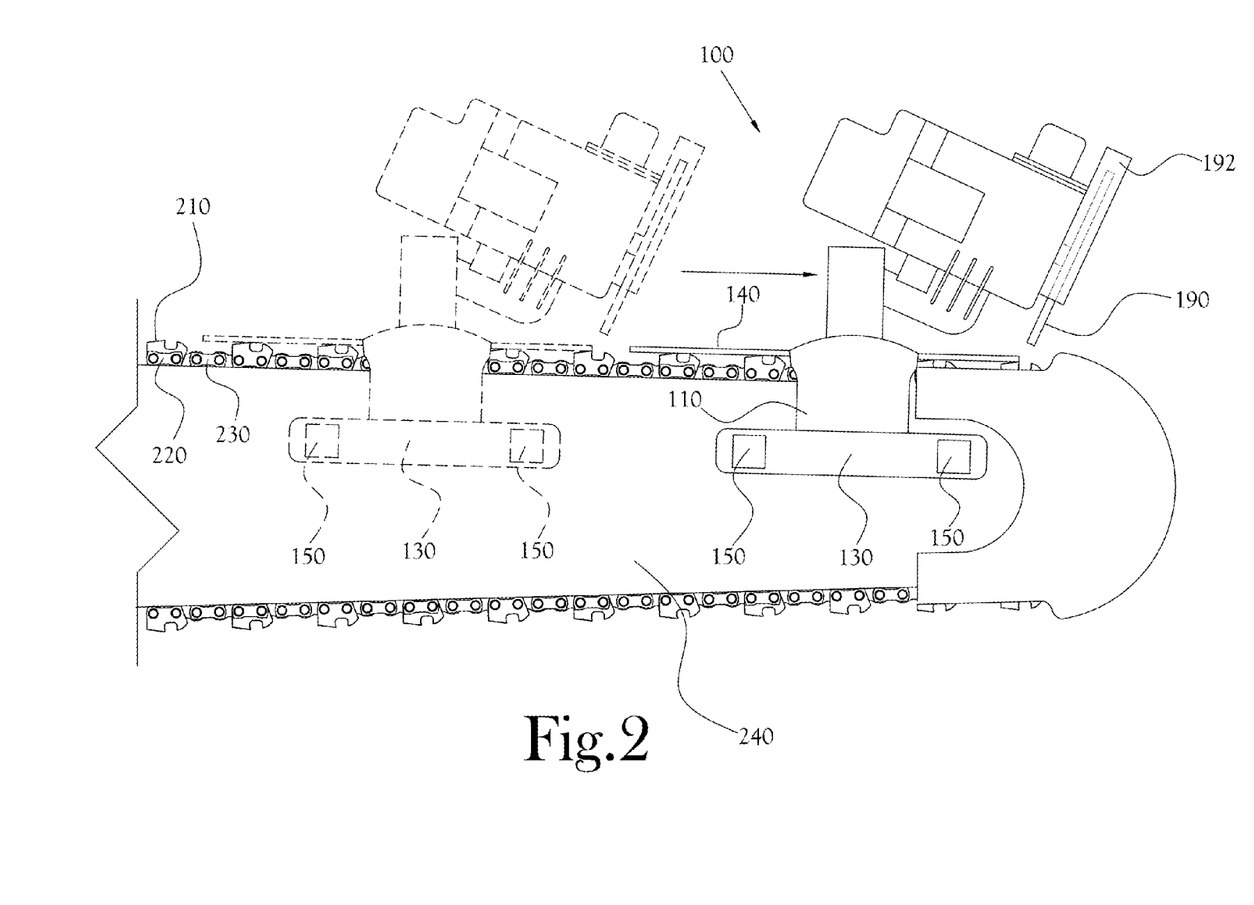
FIG. 2 illustrates the chainsaw sharpening device of FIG. 1 being used on a chainsaw bar mounted saw chain according to example embodiment of the present general inventive concept.
Figure 3:
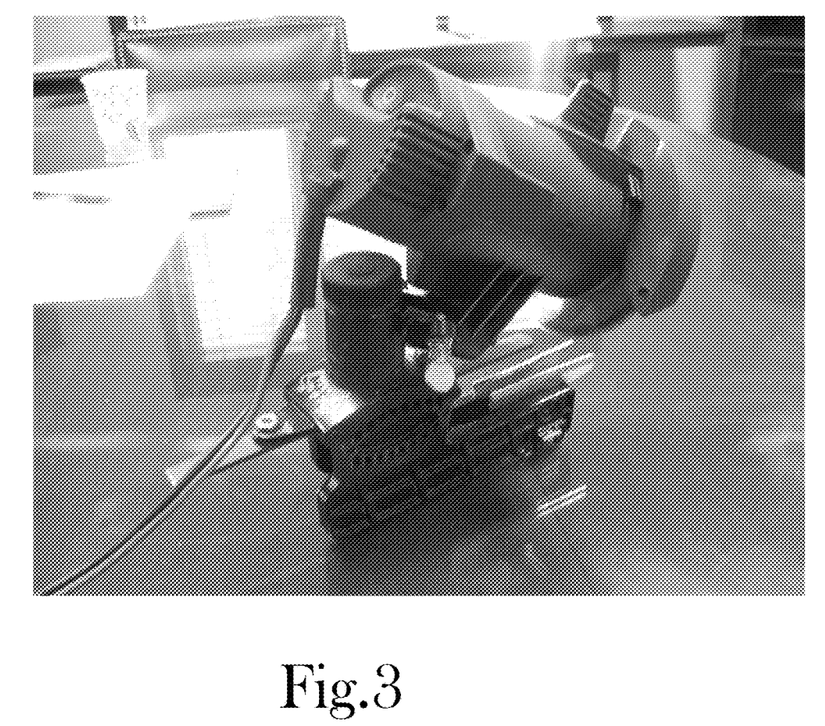
Figure 4:
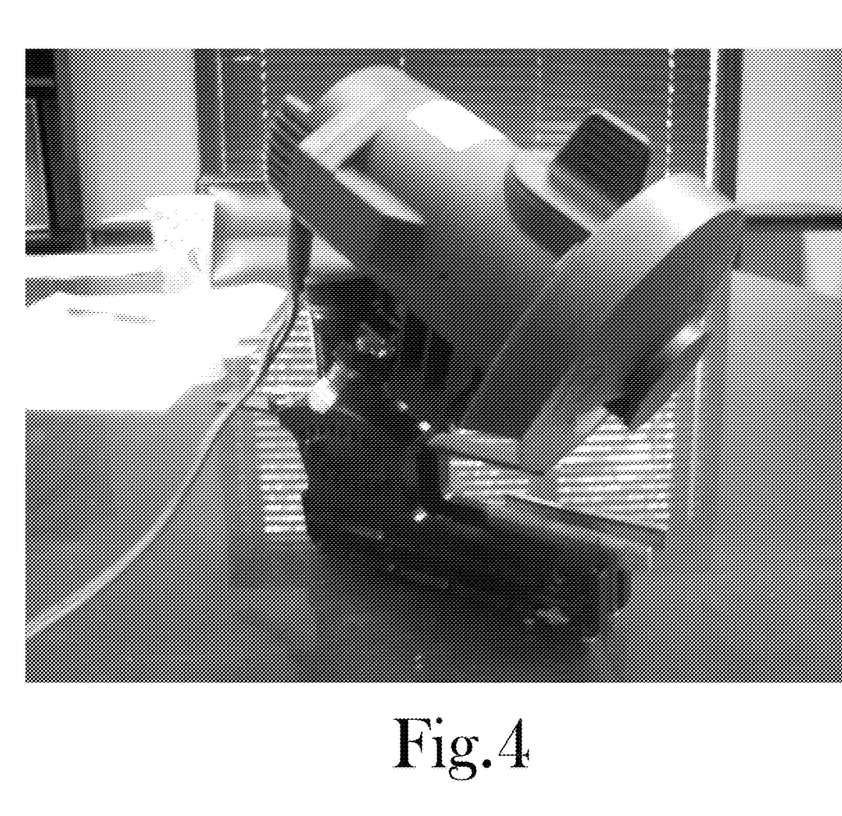
Figure 5:
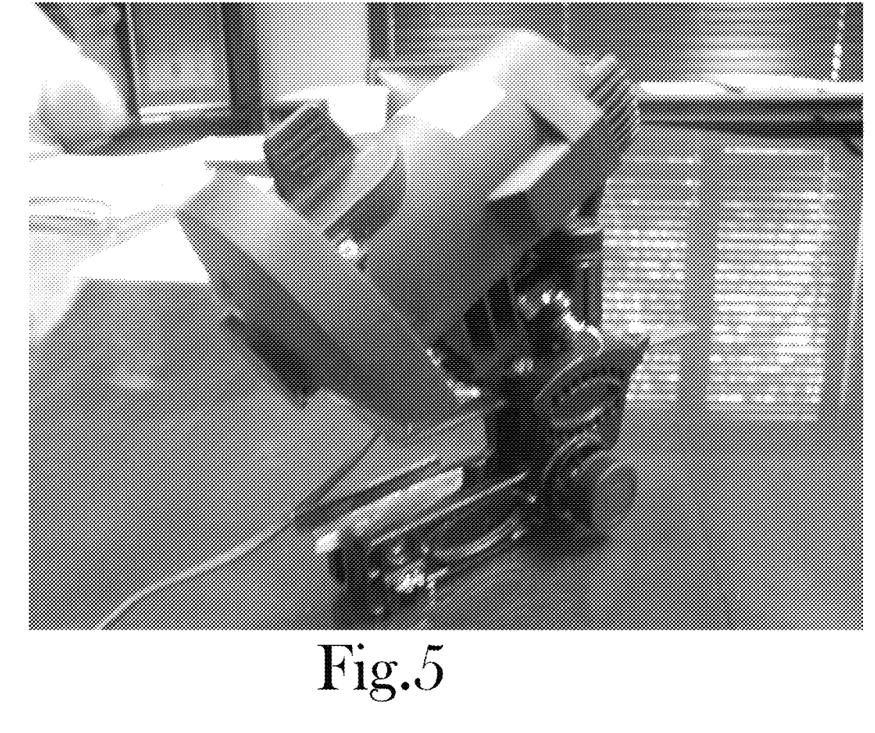
Figure 6:
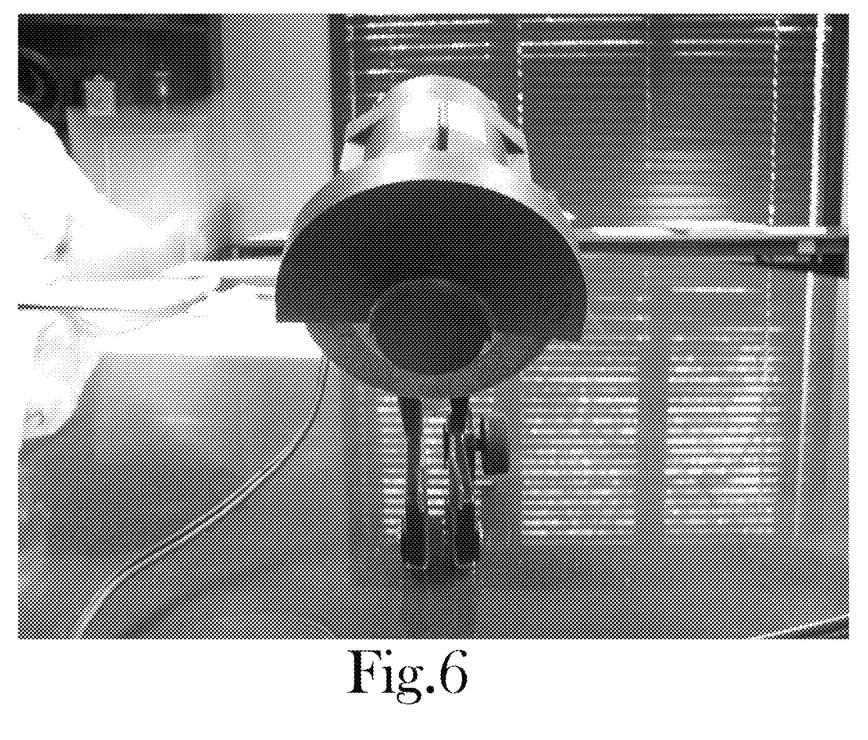
Figure 7:
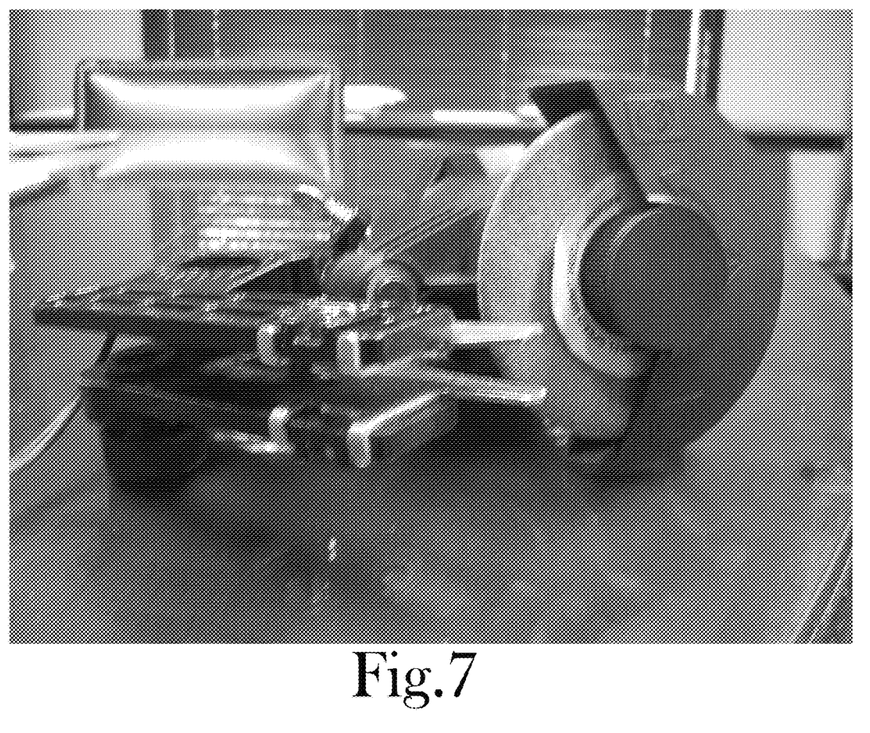

FIG. 2 illustrates the chainsaw sharpening device 100 of FIG. 1 being used on a chainsaw bar mounted saw chain according to example embodiment of the present general inventive concept. As illustrated in FIG. 2, the device 100 is able to be slid along the top plates 210 of the cutting teeth 220 while the saw chain 230 is mounted on the chainsaw bar 240, as the guide member 140 is able to support the device 100 in a slidable fashion along the tops of the top plates 210 while the first and second guide members 120,130 guide the device 100 without fixing it to the chainsaw bar 240. In other various example embodiments, the first and second guide members 120,130 may be releasably biased inward to the chainsaw bar to temporarily secure the device 100 to the bar as the device 100 is moved to each desired tooth. For example, a spring handle or the like could allow a user to use one hand to both counteract the bias of the guide members and slide the device to the next desired cutting tooth to be sharpened.

According to various example embodiments, a slidable device according to the present general inventive concept may be provided without an attached cutting tooth sharpener, so that a user may use the device to quickly locate/indicate a cutting tooth sharpening position for an unattached cutting tooth sharpener to be used to sharpen the desired tooth. For example, a slidable device to be used in a chainsaw sharpening procedure may include a base configured to fit over a saw chain mounted on a chainsaw bar, a first side member coupled to the base and configured to face a first side of the chainsaw bar, a second side member coupled to the base and configured to face a second side of the chainsaw bar, and a guide member coupled to the base and configured to be slidable along a plurality of top plates of a respective plurality of cutting teeth of a saw chain mounted on the chainsaw bar, wherein the device is configured to be slidably moved along the mounted saw chain to a desired cutting tooth to perform a sharpening procedure without the device being fixed to the chainsaw bar. Thus, a user can use one hand to slide the device from tooth to tooth to efficiently guide a grinder or other type of sharpener operated by the user's other hand, or by another user, etc. Additionally, if the sharpener is to be a file or other type of non-motorized grinder, the guide member may be provided with a lateral sharpener guide extending downwardly from one or both sides of the guide member to readily guide and/or hold the sharpener for the user.

It is understood that the present general inventive concept is not limited to any of the various features described above in regard to FIGS. 1-2.

Thus, the present general inventive concept provides a device to aid in the sharpening of a chainsaw, wherein a slidable base is provided with a guide member to rest atop a plurality of cutting teeth of a chain saw, and a plurality of side members are provided to assist in guiding the slidable base along the tops of the cutting teeth to locate an assist in the sharpening of a desired cutting tooth of a saw chain.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A chainsaw sharpening device, comprising:
a cutting tooth sharpener;
a base coupled to the cutting tooth sharpener;
a first side member coupled to the base and configured to face a first side of a chainsaw bar;
a second side member coupled to the base and configured to face a second side of the chainsaw bar; and
a guide member coupled to the base and configured to be slidable along a plurality of top plates of a respective plurality of cutting teeth of a saw chain mounted on the chainsaw bar;
wherein the chainsaw sharpening device is configured to be moved to a desired cutting tooth of the mounted saw chain to perform a sharpening procedure without being fixed to the chainsaw bar; and
wherein the guide member is configured to have at least one angled portion at a forward end thereof to correspond to a top plate cutting edge of a plurality of the cutting teeth.

2. The device of claim 1, wherein the guide member is configured to have a substantially similar width as an overall width of the top plates of the cutting teeth.

3. The device of claim 1, wherein the at least one angled portion comprises two angled portions at the forward end thereof to correspond to the top plate cutting edge of differently configured cutting edges of the plurality of the cutting teeth.

4. The device of claim 1, wherein the forward end of the guide member extends farther from the base than the first and second side members do.

5. The device of claim 1, wherein the first and second side members are configured to keep the base substantially centered at a top of the chainsaw bar.

6. A chainsaw sharpening device, comprising:
a cutting tooth sharpener;
a base coupled to the cutting tooth sharpener;
a first side member coupled to the base and configured to face a first side of a chainsaw bar;
a second side member coupled to the base and configured to face a second side of the chainsaw bar; and
a guide member coupled to the base and configured to be slidable along a plurality of top plates of a respective plurality of cutting teeth of a saw chain mounted on the chainsaw bar;
wherein the chainsaw sharpening device is configured to be moved to a desired cutting tooth of the mounted saw chain to perform a sharpening procedure without being fixed to the chainsaw bar;
wherein the first and second side members are configured to guide the base along the chainsaw bar without being fixed to the chainsaw bar; and
wherein the first and second side members are provided with magnetic elements that oppose the chainsaw bar to keep the base substantially centered at a top of the chainsaw bar.

7. The device of claim 6, wherein the first and second side members are configured to be pivotable relative to the base such that a gap between the first and second side members can be widened to fit over the saw chain.

8. A chainsaw sharpening device, comprising:
a cutting tooth sharpener;
a base coupled to the cutting tooth sharpener;
a first side member coupled to the base and configured to face a first side of a chainsaw bar;
a second side member coupled to the base and configured to face a second side of the chainsaw bar; and
a guide member coupled to the base and configured to be slidable along a plurality of top plates of a respective plurality of cutting teeth of a saw chain mounted on the chainsaw bar;
wherein the chainsaw sharpening device is configured to be moved to a desired cutting tooth of the mounted saw chain to perform a sharpening procedure without being fixed to the chainsaw bar;
wherein the cutting tooth sharpener is a rotary grinder; and
wherein the cutting tooth sharpener is configured to be pivotable relative to the base such that the cutting tooth sharpener is able to move to and from the desired cutting tooth; and
wherein an angled forward edge of the guide member is configured to be positioned to indicate a contact area of the cutting tooth to be contacted by the cutting tooth sharpener.

9. The device of claim 8, wherein the angled forward edge of the guide member is configured to align with a top plate cutting edge of the cutting tooth to be sharpened.

10. The device of 8, wherein the cutting tooth sharpener is configured to be pivotable in a lateral direction relative to the guide member to adjust an angle of the sharpening procedure.

11. The device of claim 10, wherein the guide member is adjustable in a forward and backward direction to correspond to the angle of the sharpening procedure.

12. The device of claim 11, wherein first indicia are provided on the base to indicate a range of angles to which the cutting tooth sharpener can be adjusted, and second indicia are provided on the guide member to align the guide member to a corresponding angle selected for the cutting tooth sharpener.

13. The device of claim 12, wherein respective securing members are provided to the base to secure the cutting tooth sharpener and the guide member at selected settings.

14. The device of claim 13, wherein one or both of the securing members are push button release members.

15. The device of claim 8, wherein the rotary grinder is provided with a transparent guard such that a user can visually locate the angled forward edge of the guide member during the sharpening procedure.

* * * * *

UNITED STATES PATENT AND TRADEMARK OFFICE
CERTIFICATE OF CORRECTION

PATENT NO. : 10,265,788 B2  
APPLICATION NO. : 15/364906  
DATED : April 23, 2019  
INVENTOR(S) : Scott D. Lynn Page 1 of 1

It is certified that error appears in the above-identified patent and that said Letters Patent is hereby corrected as shown below:

On the Title Page

Under abstract "15 Claims, 9 Drawing Sheets" should read --15 Claims, 2 Drawing Sheets--.

In the Drawings

Prototype photographs, Figures 3-9, should be deleted.

Signed and Sealed this  
Twenty-eighth Day of April, 2020

Andrei Iancu  
*Director of the United States Patent and Trademark Office*